United States Patent
Matthews et al.

(10) Patent No.: US 11,006,431 B2
(45) Date of Patent: May 11, 2021

(54) MODE SELECTION FOR MESH NETWORK COMMUNICATION

(71) Applicant: Landis+Gyr Innovations, Inc., Alpharetta, GA (US)

(72) Inventors: Justin Clifford Matthews, Arncliffe (AU); Michael Sean Holcombe, Roswell, GA (US)

(73) Assignee: Landis+Gyr Innovations, Inc., Alpharetta, GA (US)

( * ) Notice: Subject to any disclaimer, the term of this patent is extended or adjusted under 35 U.S.C. 154(b) by 149 days.

(21) Appl. No.: 16/285,309

(22) Filed: Feb. 26, 2019

(65) Prior Publication Data
US 2020/0275453 A1    Aug. 27, 2020

(51) Int. Cl.
*H04W 72/08*    (2009.01)
*H04L 5/00*    (2006.01)
*H04W 84/18*    (2009.01)

(52) U.S. Cl.
CPC ......... *H04W 72/085* (2013.01); *H04L 5/0007* (2013.01); *H04L 5/0055* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 2004/0184398 A1* | 9/2004 | Walton | H04L 27/2602 370/203 |
| 2007/0060064 A1 | 3/2007 | Srikrishna et al. | |
| 2013/0258950 A1 | 10/2013 | Behroozi et al. | |
| 2015/0043384 A1 | 2/2015 | Hui et al. | |
| 2015/0092774 A1* | 4/2015 | Fartmann | H04L 47/15 370/389 |

OTHER PUBLICATIONS

International Patent Application No. PCT/US2020/019284, International Search Report and Written Opinion dated Jun. 9, 2020, 11 pages.

* cited by examiner

*Primary Examiner* — Chi H Pham
*Assistant Examiner* — Raul Rivas
(74) *Attorney, Agent, or Firm* — Kilpatrick Townsend & Stockton LLP

(57) ABSTRACT

A system for selecting a communication mode for a transmitting node to communicate with a receiving node in a mesh network is provided. For example, a transmitting node can gather mode selection data that describe communication conditions of the transmitting node and the receiving node. Based on the mode selection data, the transmitting node can determine a first white list of modes that can be used by the transmitting node to successfully transmit data packets to the receiving node. The transmitting node also determines a second white list of modes that can be used by the receiving node to send acknowledgment packets successfully to the transmitting node. The transmitting node further identifies overlapped modes between the first and second white lists of modes. The transmitting node can then select one of the overlapped modes for transmitting data packets to the receiving node.

23 Claims, 7 Drawing Sheets

MODE SELECTION FOR MESH NETWORK COMMUNICATION

TECHNICAL FIELD

This disclosure relates generally to communications between nodes in a mesh network. More particularly, this disclosure relates to selecting a communication mode by a transmitting node for communication with a receiving node of the mesh network.

BACKGROUND

In a network, infrastructure nodes (or simply "nodes"), such as meters, gateways, or routers, constantly communicate with each other to, for example, exchange messages or transmit data. Different nodes, however, have different hardware and software configurations and thus may support different communication modes. In addition, each node may support multiple communication modes. For example, some nodes might be configured to support certain communication modes of orthogonal frequency-division multiplexing ("OFDM") while other nodes are configured to support another set of OFDM communication modes. Some nodes might also be configured to support communication modes based on frequency-shift keying (FSK) in addition to OFDM. As such, when transmitting data, a transmitting node needs to select a communication mode among the multiple supported communication modes so that the data can be transmitted to the receiving node reliably and efficiently.

SUMMARY

Aspects and examples are disclosed for apparatuses and process for selecting a communication mode for a transmitting node in a network. For instance, a method for determining a communication mode for communication between a transmitting node and a receiving node in a network includes accessing, by the transmitting node, mode selection data that describe communication conditions of the transmitting node and the receiving node. The mode selection data includes an SNR requirement of the receiving node, an SNR requirement of the transmitting node and a maximum transmission power of the receiving node and a transmission power of the transmitting node. The transmitting node determines a first list of modes that can be used by the transmitting node to transmit data packets to the receiving node based on the SNR requirement of the receiving node and the transmission power of the transmitting node. The transmitting node further determines a second list of modes that can be used by the receiving node to transmit acknowledgment packets to the transmitting node based on the SNR requirement of the transmitting node and the maximum transmission power of the receiving node. The transmitting node selects a communication mode that is on both the first list of modes and the second list of modes, and transmits the data packets to the receiving node using the selected communication mode.

In another example, a node of a network includes a processor configured to execute computer-readable instructions, and a memory configured to store the computer-readable instructions that, when executed by the processor, cause the processor to perform operations. The operations include accessing mode selection data that describe communication conditions of the transmitting node and the receiving node. The mode selection data include an SNR requirement of the receiving node, an SNR requirement of the transmitting node and a maximum transmission power of the receiving node and a transmission power of the transmitting node. The operations further include determining a first list of modes that can be used by the transmitting node to transmit data packets to the receiving node based upon the SNR requirement of the receiving node and the transmission power of the transmitting node, and determining a second list of modes that can be used by the receiving node to transmit acknowledgement packets to the transmitting node based upon the SNR requirement of the transmitting node and the maximum transmission power of the receiving node. The operations also include selecting a communication mode that is on both the first list of modes and the second list of modes and transmitting the data packets to the receiving node using the selected communication mode.

In an additional example, a method for determining a communication mode for a transmitting node in a network is provided. The method includes determining, by the transmitting node, a first list of modes that can be used by the transmitting node to transmit data packets to a receiving node based, at least in part, upon an SNR requirement of the receiving node and a transmission power of the transmitting node. The method further includes determining, by the transmitting node, a second list of modes that can be used by the receiving node to transmit acknowledgment packets to the transmitting node based, at least in part, upon an SNR requirement of the transmitting node and a maximum transmission power of the receiving node. The transmitting node then selects a communication mode that is on both the first list of modes and the second list of modes and transmits the data packets to the receiving node using the selected communication mode.

These illustrative aspects and features are mentioned not to limit or define the presently described subject matter, but to provide examples to aid understanding of the concepts described in this application. Other aspects, advantages, and features of the presently described subject matter will become apparent after review of the entire application.

BRIEF DESCRIPTION OF THE FIGURES

These and other features, aspects, and advantages of the present disclosure are better understood when the following Detailed Description is read with reference to the accompanying drawings.

DETAILED DESCRIPTION

Figure 1:
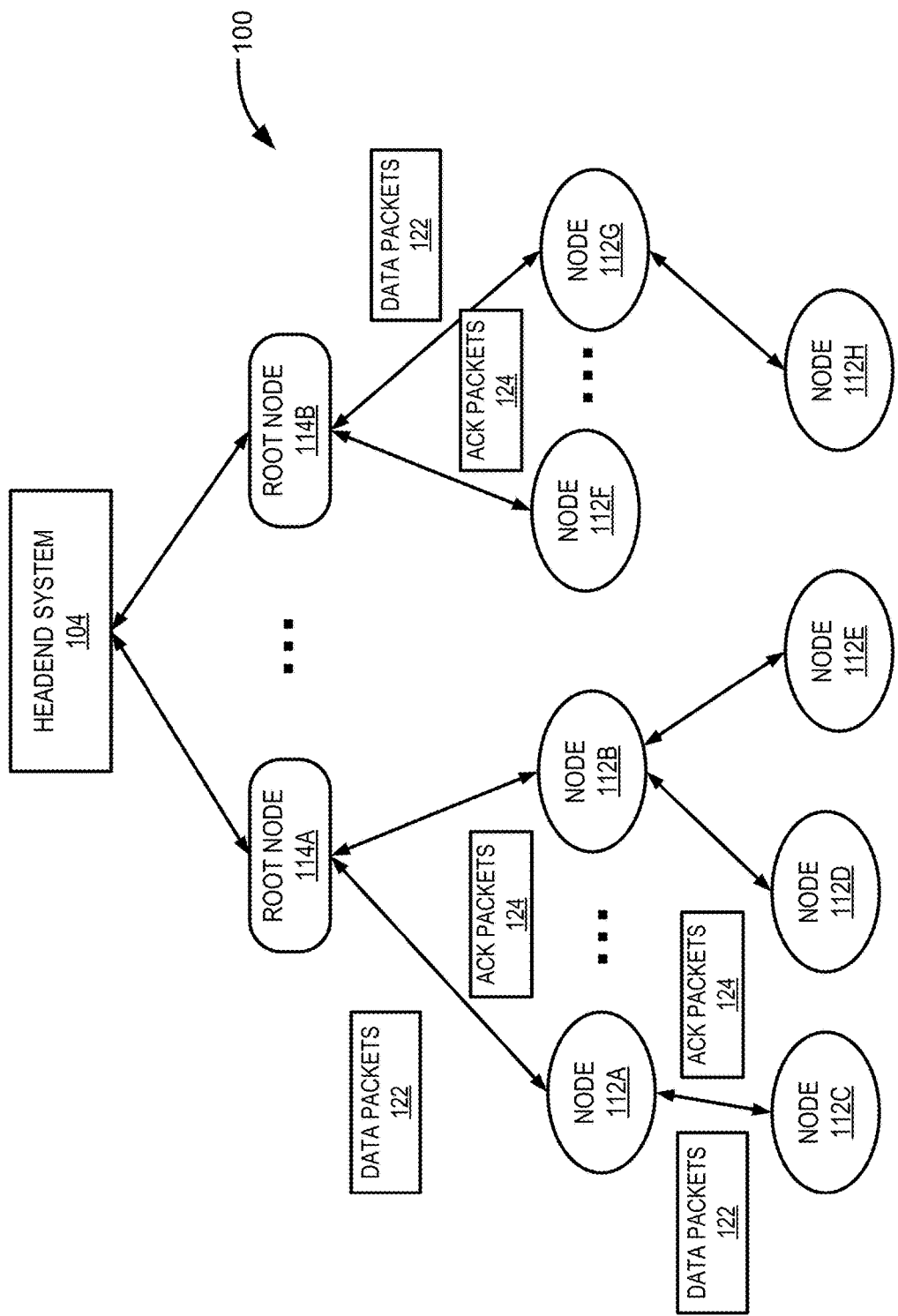
FIG. 1 is a block diagram showing an illustrative operating environment for selecting a communication mode for a transmitting node in a network, according to certain examples of the disclosure.

Systems and methods are provided for selecting a communication mode for a transmitting node to communicate with a receiving node in a mesh network. For example, a transmitting node can gather mode selection data that describe communication conditions of the transmitting node and the receiving node, such as the SNR requirement of the receiving node and the transmitting node, the maximum transmission power of the transmitting node and the receiving node, the noise floor at the receiving node and the transmitting node, an estimated path loss between the transmitting node and the receiving node, and other information. The mode selection data can be updated when a new neighbor joins the network, and when data packets are transmitted or received by the transmitting node.

Based on the mode selection data, the transmitting node can determine, from a list of modes supported by the transmitting node, a first white list of modes that can be used by the transmitting node to successfully transmit data packets to the receiving node based on the mode selection data. For example, for each of the supported modes, the transmitting node can calculate a link budget for transmitting data packets to the receiving node using the mode. The transmitting node can further estimate a path loss from the transmitting node to the receiving node. If the link budget is higher than the path loss for the mode, the mode is added to the white list of modes for transmitting the data packets.

The transmitting node also determines a second white list of modes that can be used by the receiving node to send acknowledgment packets successfully to the transmitting node. Similar to the above example for determining the first white list of mode, the transmitting node calculates a link budget and a path loss for transmitting acknowledgment packets from the receiving node to the transmitting node using a supported mode. If the link budget is higher than the path loss using the supported mode, the mode is added to the second white list of modes for transmitting acknowledgment packets.

The transmitting node further identifies overlapped modes between the first and second white lists of modes. The transmitting node can then select one of the overlapped modes for transmitting data packets to the receiving node. In another example, the transmitting node further calculates an air time for each of the overlapped modes. The air time of a mode includes an amount of time for the transmitting node to complete a communication with the receiving node using the mode, including transmitting the data packets to the receiving node and receiving the acknowledgment packets from the receiving node. If the transmitting node has a base mode different from the mode, the air time further includes the amount of time for switching the transmitting node from the base mode to the mode. Based on the calculated air time, the transmitting node can further select, from the overlapped modes of the first and second white lists, a communication mode that has the least air time for the communication with the receiving node.

Techniques described in the present disclosure increases the efficiency of the communication between nodes of a network. By considering both the transmission of data packets and acknowledgment packets, a transmitting node can select a communication mode that leads to a higher success rate of transmission than considering the data packets transmission alone. In addition, by frequently updating the mode selection data based on communications between the transmitting node and the receiving node, the mode selection data can accurately reflect the transmission conditions between the transmitting node and the receiving node. As such, the communication mode selected based on the mode selection data is suitable for the communication channel between the transmitting node and the receiving node. Furthermore, selecting a communication mode based on the air time of the transmission further reduces the time period of communication thereby allowing more communications to be performed between the nodes and thus increasing the communication efficiency of the network.

FIG. 1 shows an illustrative network 100 in which nodes can determine communication modes used for communicating with other nodes in the network. The network 100 shown in FIG. 1 includes multiple nodes 112A-112H (which may be referred to herein individually as a node 112 or collectively as the nodes 112). The nodes 112 may include measuring nodes for collecting data from the respective deployed location of the nodes, processing nodes for processing data available to the nodes, router nodes for forwarding data received from one node to another node in the network 100, or nodes that are configured to perform a combination of these functions. The nodes 112 are further configured to communicate with each other so that messages or data can be exchanged between the nodes 112.

In one example, the network 100 can be associated with a resource distribution network, such as a utility network, to deliver measurement data obtained in the resource distribution network. In this example, the nodes 112 can include meters such as electricity meters, gas meters, water meters, steam meters, etc. and be implemented to measure various operating characteristics of the resource distribution network and to transmit the collected data through the network 100 to, for example, root nodes 114A and 114B (which may be referred to herein individually as a root node 114 or collectively as the root nodes 114).

Root nodes 114 of the network 100 may be configured for communicating with the nodes 112 to perform operations such as managing the nodes 112, collecting data from the nodes 112 and forwarding data to a headend system 104. A root node 114 can also be configured to function as a node to measure and process data itself. The root nodes 114 may be personal area network (PAN) coordinators, gateways, or any other devices capable of communicating with the headend system 104. The root nodes 114 ultimately transmit the generated and collected data to the headend system 104 via one or more additional networks (not shown in FIG. 1). The headend system 104 can function as a central processing system that receives streams of data or messages from the root node 114. The headend system 104 can process the collected data or have the collected data be processed for various applications.

In order for the nodes of the network 100 to communicate with each other, each node is configured to support one or more communication modes. For example, a node 112 may be configured to support OFDM at different modulation and coding schemes (MCS) levels. Another node may be configured to support both OFDM and FSK at various data rates. Because different nodes of the network 100, including the nodes 112 and the root nodes 114, may be configured differently, their capabilities of supporting communication modes can be different. In one example, each node in the network is configured with a common base mode of communication. This base mode is determined by the capabilities of the deployment. For example, a node deployment might contain some older, less capable nodes alongside newer, more capable nodes. In this case, the base mode for the network can be a mode that the older nodes can support, such as the FSK modulation. The newer OFDM capable nodes can use the FSK base mode for multicast messages and to initiate a mode switch operation. Further, in this deployment, a node can be assumed to have the minimum capabilities required to join the network and support the base node until positive confirmation from that node that it has enhanced capabilities is received. In one example, this information can be shared using an information element defined in the IEEE 802.15.4 standard.

In another node deployment where all nodes have enhanced capabilities, such as supporting OFDM, each of the nodes can be configured to use the same OFDM option as the base mode. In another example where the nodes in the network are capable of simultaneous dual band operation, the base mode for one band (e.g. 900 MHz band) can be FSK, but the base mode for another band (e.g. 2.4 GHz band) can be OFDM. As will be discussed in detail with regard to FIG. 3, for a dual band node, determining the communication mode also includes determining the communication band.

In order for a pair of nodes to communicate with each other, the node that transmits data, also referred to herein as the "transmitting node," needs to determine a communication mode so that data packets 122 can be successfully transmitted to the other node, also referred to herein as the "receiving node." According to some aspects of the disclosure, the selected communication mode also can be used by the receiving node to successfully transmit acknowledgment packets 124 back to the transmitting node to confirm that it has received the data packets 122. Additional details regarding the transmitting node selecting a communication mode are described below with regard to FIGS. 2-6.

It should be appreciated that the mechanism described herein for selecting a communication mode can be utilized by any nodes in the network 100, including the node 112, the root node 114, or any other nodes of the network 100 that are capable of communicating with other nodes of the network. In addition, while FIG. 1 depicts a specific network topology (e.g., a DODAG tree), other network topologies are also possible (e.g., a ring topology, a mesh topology, a star topology, etc.).

Figure 2:
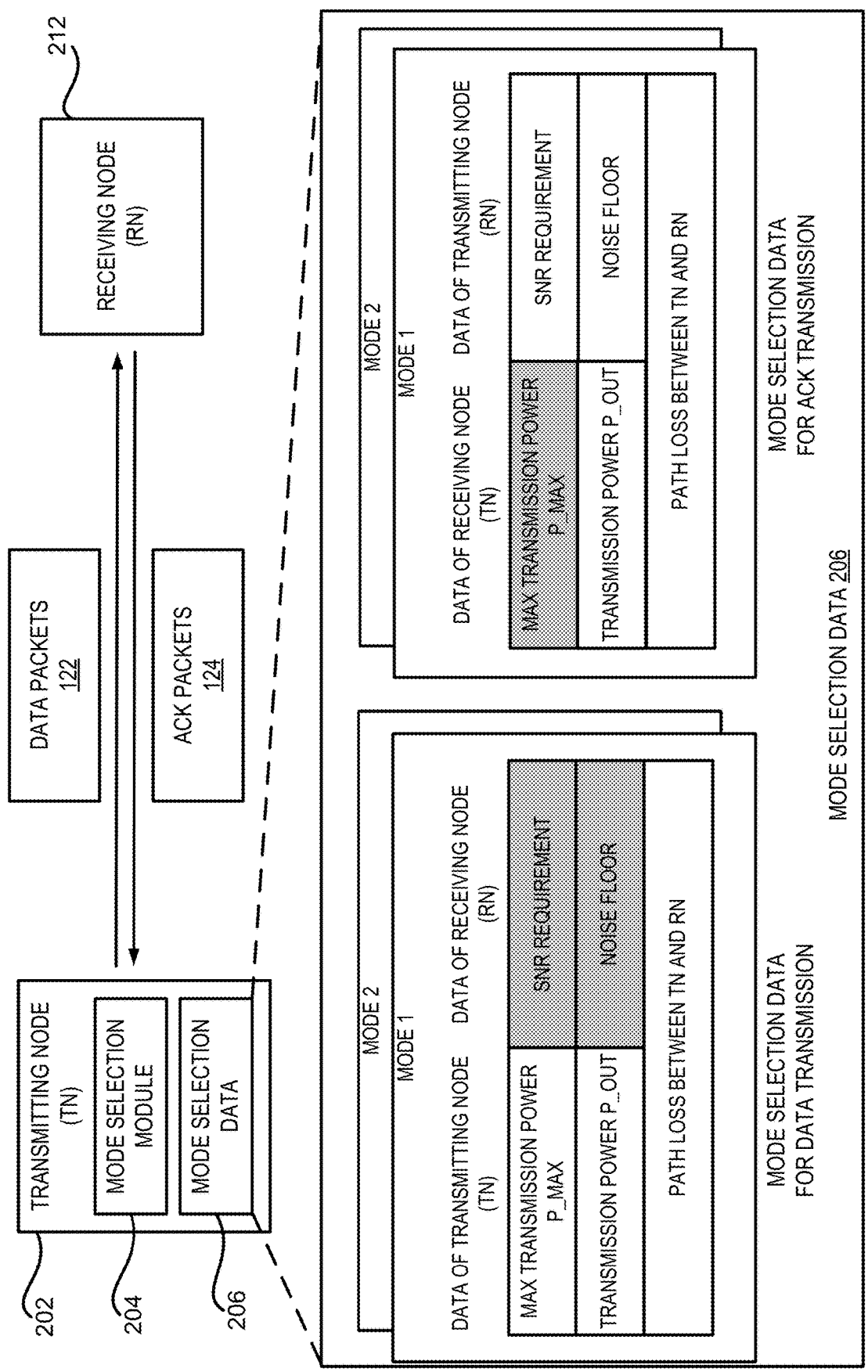
FIG. 2 is a diagram showing aspects of a transmitting node configured for selecting a communication mode for communication with a receiving node, according to certain examples of the disclosure.

Referring now to FIG. 2, FIG. 2 illustrates aspects of a transmitting node 202 configured for selecting a communication mode for communication with a receiving node 212. The transmitting node 202 can be a node 112, a root node 114, or any other node of the network 100 that is capable of communicating with another node in the network. The receiving node 212 is a neighbor of the transmitting node 202, i.e. any node in the network 100 that the transmitting node 202 can directly communicate with. Further, communication between the transmitting node 202 and the receiving node 212 includes data transmission, i.e. transmitting data packets 122 from the transmitting node 202 to the receiving node 212, and acknowledgment transmission, i.e. transmitting the acknowledgment packets 124 from the receiving node 212 back to the transmitting node 202. The selected communication mode is used for both the data transmission and the acknowledgment transmission.

The transmitting node 202 can include a mode selection module 204 configured to select a communication mode so that the transmitting node 202 can successfully complete communication with the receiving node 212 using the selected communication mode. The transmitting node 202 can further include or have access to mode selection data 206. The mode selection data 206 describe communication conditions of the transmitting node 202 and the receiving node 212 and can be utilized to determine the communication mode for data transmission and acknowledgment transmission. FIG. 2 illustrates examples of the data entries contained in the mode selection data 206.

In the example shown in FIG. 2, the mode selection data 206 include mode selection data for data transmission and mode selection data for acknowledgment transmission. In data transmission, in order for data packets 122 to be successfully transmitted from the transmitting node 202 to the receiving node 212, the transmitted signal should be strong enough so that after the distortions introduced by the communication channel between the transmitting node 202 and the receiving node 212, the transmitted signal is still discernable at the receiving node 212. The distortions can include the power attenuation of the transmitted signal as it propagates through the communication path between the transmitting node 202 and the receiving node 212, also referred to herein as "path loss." The distortion can further include noise introduced to the transmitted signal during its transmission such as the noise observed at the receiving node 212.

As a result, in order for the data packets 122 to be successfully received at the receiving node 212, the mode selection module 204 can select a communication mode so that the data packets 122 are transmitted using a power strength that can survive the various distortions. To achieve this, the mode selection data for data transmission can include data describing the transmission power used for transmitting the data packets 122 and the distortion suffered by the data packets 122 during the transmission. In the example shown in FIG. 2, the mode selection data for data transmission include, for each communication mode, the output transmission power of the transmitting node 202, the SNR requirement at the receiving node 212, the noise floor observed at the receiving node 212, and the path loss between the transmitting node 202 and the receiving node 212. The mode selection data can further include the maximum output power of the transmitting node 202 so that the transmission power of the selected mode does not exceed the maximum output power.

With the mode selection data 206, the mode selection module 204 can determine, for each of the communication modes supported by the transmitting node 202 and the receiving node 212, whether the data packets 122 can be successfully received by the receiving node 212. In one example, this determination can be made based on calculating a link budget and comparing the link budget with the path loss between the transmitting node 202 and the receiving node 212. More specifically, the link budget for communication mode i used for data communication, denoted as $L_i^{DAT}$ can be defined as:

$$L_i^{DAT} = P_{out\_i}^{TN} - S_i^{RN}, \quad (1)$$

where $P_{out\_i}^T$ is the output transmission power of the transmitting node 202 for communication mode i; $S_i^{RN}$ is the sensitivity at the receiving node 212 and is defined as $$S_i^{RN} = F_i^{RN} + SNR_{min\_i}^{RN}, \quad (2)$$

$FR_i^{RN}$ is the noise floor observed at the receiving node 212 when the communication mode i is used for transmission, and $SNR_{min\_i}^{RN}$ is the minimum SNR required to decode the data packets 122 by the receiving node 212 using communication mode i.

The mode selection module 204 then compares the link budget $L_i^{DAT}$ with the path loss between the transmitting node 202 and the receiving node 212, denoted as PL. If the link budget $L_i^{DAT}$ is higher than the path loss PL, the mode selection module 204 determines that the communication mode i can be utilized to transmit the data packets 122 and adds the communication mode i to a white list of modes for data transmission. Otherwise, the communication mode i cannot be utilized for the data transmission.

Similar to the above process for data transmission, the mode selection module 204 can access mode selection data for acknowledgment transmission to determine a white list of modes for acknowledgment transmission. The mode selection data for acknowledgment transmission can include data describing the transmission power used for transmitting the acknowledgment packets 124 and the distortion suffered by the acknowledgment packets 124 during the transmission. In the example shown in FIG. 2, the mode selection data for acknowledgment transmission include, for each communication mode, the output transmission power of the receiving node 212, the SNR requirement at the transmitting node 202, the noise floor observed at the transmitting node 202, and the path loss between the transmitting node 202 and the receiving node 212. The mode selection data for acknowledgment transmission can further include the maximum output power of the receiving node 212 so that the transmission power of the selected mode does not exceed the maximum output power of the receiving node 212.

Based on the mode selection data for acknowledgment transmission, the mode selection module 204 can determine, for each of the communication modes supported by the transmitting node 202 and the receiving node 212, whether the acknowledgment packets 124 can be successfully transmitted from the receiving node 212 to the transmitting node 202. In one example, this determination can be made based on calculating a link budget and comparing the link budget with the path loss between the receiving node 212 and the transmitting node 202. More specifically, the link budget for communication mode j used for acknowledgment transmission, denoted as $L_j^{ACK}$, can be defined as:

$$L_j^{ACK} = P_{out\_j}^{RN} - S_j^{TN}, \quad (3)$$

where $P_{out\_j}^{RN}$ is the output transmission power of the receiving node 212 for communication mode j; $S_j^{TN}$ is the sensitivity at the transmitting node 202 and is defined as $$S_j^{TN} = F_j^{TN} + SNR_{min\_j}^{TN}. \quad (4)$$

$F_j^{TN}$ is the noise floor observed at the transmitting node 202 when the communication mode j is used for acknowledgment transmission, and $SNR_{min\_j}^{TN}$ is the minimum SNR required to decode the acknowledgement packets 124 by the transmitting node 202 using communication mode j.

The mode selection module 204 then compares the link budget $L_j^{ACK}$ with the path loss, PL. If the link budget $L_j^{ACK}$ is higher than the path loss PL, the mode selection module 204 determines that the communication mode j can be utilized to transmit the acknowledgement packets 124 and adds the communication mode j to a white list of modes for acknowledgment transmission. Otherwise, the communication mode j cannot be utilized for the acknowledgment transmission.

The mode selection module 204 can determine the communication mode by examining the overlapped modes of the two white lists, i.e. the modes that are on both the white list of modes for data transmission and the white list of modes for acknowledgment transmission. Each of the overlapped modes can be utilized by the transmitting node 202 to complete the communication with the receiving node 212, i.e. transmitting the data packets 122 to the receiving node 212 and receiving acknowledgment packets 124 from the receiving node 212.

In order to achieve high communication efficiency, the transmitting node 202 can further select, from the overlapped modes, a communication mode that has the least air time. As used herein, the air time of a mode includes an amount of time for the transmitting node 202 to complete a communication with the receiving node 212 using the mode, including transmitting the data packets 122 to the receiving node 212 and receiving the acknowledgment packets 124 from the receiving node 212. If the transmitting node 202 has a base mode different from the mode, the air time further includes the amount of time for switching the transmitting node from the base mode to the mode. In one example, the base mode of a transmitting node 202 is the default mode that the transmitting node 202 operates. Additional examples of calculating air time for a communication mode are described below with regard to FIG. 3.

As discussed above, the two white lists of modes are determined based on the mode selection data 206. Some of the data in the mode selection data 206 are available or can be obtained locally at the transmitting node 202, such as the data of the transmitting node 202 illustrated in FIG. 2, including the maximum transmission power, the transmission power, the SNR requirement, and the noise floor of the transmitting node 202. Other data of the mode selection data 206 need to be obtained from the receiving node 212, such as the data of the receiving node including the maximum transmission power, the transmission power, the SNR requirement, and the noise floor of the receiving node 212. Data such as the path loss between the transmitting node 202 and the receiving node 212 can be estimated based on data obtained at the transmitting node 202 and from the receiving node 212.

For instance, data such as the maximum transmission power and the SNR requirement of the transmitting node 202 for each mode are determined by the device capability of the transmitting node 202 and do not change over time. Thus, these static data can be loaded to the mode selection data 206 and made available to the mode selection module 204. Similarly, the maximum transmission power and the SNR requirement of the receiving node 212 for each mode are determined by the device capability of the receiving node 212 and also remain static. These static data of the receiving node 212 can be sent by the receiving node 212 to the transmitting node 202 at a certain time prior to the communication involving the data packets 122. For example, when the receiving node 212 first joins the network 100 and detects that the transmitting node 202 is a neighbor of the receiving node 212, the receiving node 212 can send the static data of the receiving node 212 to the transmitting node 202 along with other information. Likewise, the transmitting node 202 can also send its static data of maximum transmission power and the SNR requirement to the receiving node 212, for example, upon detecting that the receiving node 212 has joined the network so that the receiving node 212 can use these data for selecting its communication mode.

Data such as the noise floor and the path loss change over time. The transmitting node 202 can obtain or otherwise estimate these dynamic data from time to time. For example, the transmitting node 202 can estimate its noise floor by estimating a received signal strength indicator (RSSI) based on unused slots of packets received at the transmitting node 202. The transmitting node 202 can obtain the noise floor of the receiving node 212 through communications with the receiving node 212. In some implementations, the transmitting node 202 and the receiving node 212 estimate their respective noise floor and insert the respective noise floor into the data packets 122 and the acknowledgment packets 124 that are communicated between the transmitting node 202 and the receiving node 212. In this way, the transmitting node 202 and the receiving node 212 can obtain the up-to-update noise floor information of the other node.

To reduce the impact of the inaccuracy in the estimated noise floor, the transmitting node 202 can generate a smoothed noise floor for the receiving node 212, instead of using the noise floor value received from the receiving node 212. For example, the transmitting node 202 can average the multiple values of the noise floor received from the receiving node 212 according to a weighting mechanism to generate the smoothed noise floor. The weighting mechanism can include, for example, weighted averaging of the noise floor values using varying weights where newer noise floor values have higher weights than older noise floor values. The smoothed noise floor of the receiving node 212 can be included in the mode selection data 206. As new packets are received from the receiving node 212, the transmitting node 202 can update the smoothed noise floor using the noise floor value received in the new packets. The noise floor at the transmitting node 202 can be estimated similarly to generate a smoothed noise floor by applying a weighted averaging mechanism on the noise floors estimated at different time points.

The path loss can be estimated by the transmitting node 202 based on previous packets received from the receiving node 212. In one example, the transmitting node 202 can estimate the path loss PL between the transmitting node 202 and the receiving node 212 as follows:

$$PL = P_{out}' - RSSI', \tag{5}$$

where $P_{out}'$ is the power used by the receiving node 212 to transmit a previous packet to the transmitting node 202. In some implementation, $P_{out}'$ is specified in the transmitted packet, such as using a designated field of the transmitted packet. RSSI' is the received signal strength indicator (RSSI) of the received packet measured at the transmitting node 202. Similar to the noise floor, the path loss can also be smoothed over time by the transmitting node 202 to generate a smoothed path loss, for example, using a weighted averaging method. A new path loss can be estimated each time a new packet is received from the receiving node 212 and be utilized to update the smoothed path loss.

In the example mode selection data 206 shown in FIG. 2, the shaded data represent the data that are obtained from the receiving node 212 and non-shaded data are obtained or generated at the transmitting node 202. It should be understood that the mode selection data 206 may contain data elements other than those shown in FIG. 2, and may not contain all the data elements shown in FIG. 2. Further, data elements in the mode selection data 206 might be arranged differently from the structure shown in FIG. 2. For example, while FIG. 2 shows that the maximum transmission power of the transmitting node 202 appears on the mode selection data for each mode, this data element can be stored separately from the mode selection data for a specific communication mode since multiple modes might share the maximum transmission power. Similarly, path loss can also be stored separately from the mode selection data for a specific communication mode since multiple modes might share the same path loss estimation.

Likewise, while the mode selection data 206 for a mode is divided into mode selection data for data transmission and mode selection data for acknowledgment transmission, the mode selection data 206 can be divided in other ways. For example, the mode selection data 206 can be divided into static mode selection data, including the maximum transmission power and the SNR requirement of the nodes, and dynamic mode selection data, including noise floor, path loss, and transmission power, etc. Various other ways of organizing the mode selection data 206 can be utilized.

It should be further understood that the mode selection data 206 shown in FIG. 2 may represent a table, an object stored in a memory, a programmatic structure, or any other data container commonly known in the art. Each data element included in this data structure may represent one or more fields or columns of a table, one or more attributes of an object, one or more member variables of a programmatic structure, or any other unit of data of a data structure commonly known in the art. The implementation is a matter of choice and may depend on the technology, performance, and other requirements of the node upon which the data structure is implemented.

Figure 3:
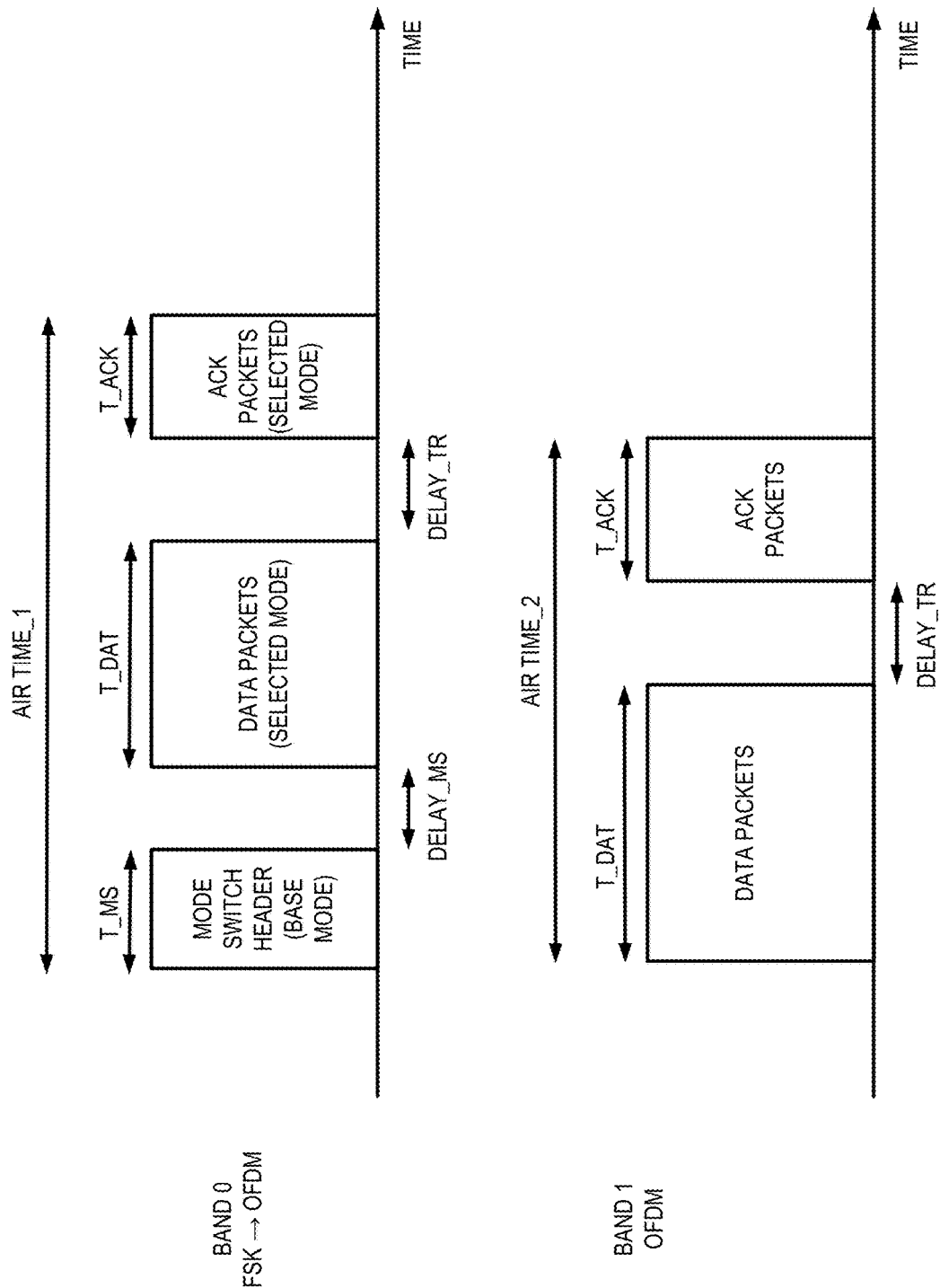
FIG. 3 is a diagram illustrating examples of calculating air time for different modes supported by a dual-band transmitting node, according to certain examples of the disclosure.

Referring now to FIG. 3, where examples for calculating air time for communication modes supported by a dual-band transmitting node are described. FIG. 3 shows the timelines for communications from a transmitting node 202 to a receiving node 212 using different bands. In the example shown in FIG. 3, the transmitting node 202 supports two transmission bands: band 0 operating at a low-frequency band (e.g. 900 MHz band) and band 1 operating at a high-frequency band (e.g. 2.4 GHz band).

In one example, band 0 of the transmitting node 202 is configured with a base mode of a low data rate modulation scheme, such as FSK 50 Kbps, in order to communicate with nodes that only support the low data rate modulation scheme. Band 0 also supports communication modes of a high data rate modulation scheme, such as OFDM 2.4 Mbps, so that the transmitting node 202 can communicate with nodes that support this high data rate scheme. If the transmitting node 202 is to transmit data through band 0 using a communication mode of the high data rate modulation scheme, the transmitting node 202 needs to transmit a mode switch header using the base mode to the receiving node 212 before switching to the high data rate mode. Band 1 of the transmitting node 202 does not support the low data rate modulation scheme, and thus always transmits data using the communication modes of the high data rate modulation scheme.

FIG. 3 illustrates the air time of a communication between the transmitting node 202 and the receiving node 212 using a communication mode of OFDM. The communication mode selected for band 0 is OFDM 2.4 Mbps and the communication mode used in band 1 is OFDM 1.6 Mbps. As shown in FIG. 3, the air time of the communication using band 0 includes the time for transmitting the mode switch header in the base mode T_MS, the delay DELAY_MS caused by switching from the base mode to the selected OFDM 2.4 Mbps mode, the time T_DAT for transmitting the data packets 122 using the selected mode, the delay DELAY_TR caused by the receiving node 212 generating the acknowledgement packets 124, and the time T_ACK for transmitting the acknowledgement packets 124 back to the transmitting node 202.

The air time of the communication using band 1, on the other hand, only includes the time for transmitting the data packets 122 using the selected mode OFDM 1.6 Mbps, the delay DELAY_TR caused by the receiving node 212 generating the acknowledgment packets 124, and the time T_ACK for transmitting the acknowledgement packets 124 back to the transmitting node 202. Because of the delay caused by switching from the base mode to the selected mode and the time spent on sending mode switch header using the low data rate mode, the air time for the band 0 communication might be longer than that of the band 1 even though the data rate of the selected mode for band 1, i.e. 1.6 Mbps, is lower than the data rate of the selected mode for band 0, i.e. 2.4 Mbps. In other scenarios, it is possible that the air time of the band 1 communication is longer than the band 0 communication because of the low data rate of the selection mode for band 1. The less the air time of communication is, the more data packets can be transmitted to the receiving node 212 within a given time period, and thus the higher the network efficiency is.

Accordingly, the transmitting node 202 can select, among the overlapped modes of the two white lists of modes, the communication mode that leads to the least air time as the communication mode for the transmitting node 202. It can be further seen from the above disclosure that, for a multi-band transmitting node, such as the dual-band transmitting node shown in FIG. 3, the band used for communication can be selected along with the communication mode using the process described above. In other words, a multi-band transmitting node can select a communication mode and a band for the communication by selecting a combination of the communication mode and the band so that the data packets 122 can be successfully transmitted to the receiving node 212 and the acknowledgment packets 124 can be successfully received by the transmitting node 202 based on the mode selection data 206 and that the air time of the communication is minimized among the supported modes.

Figure 4:
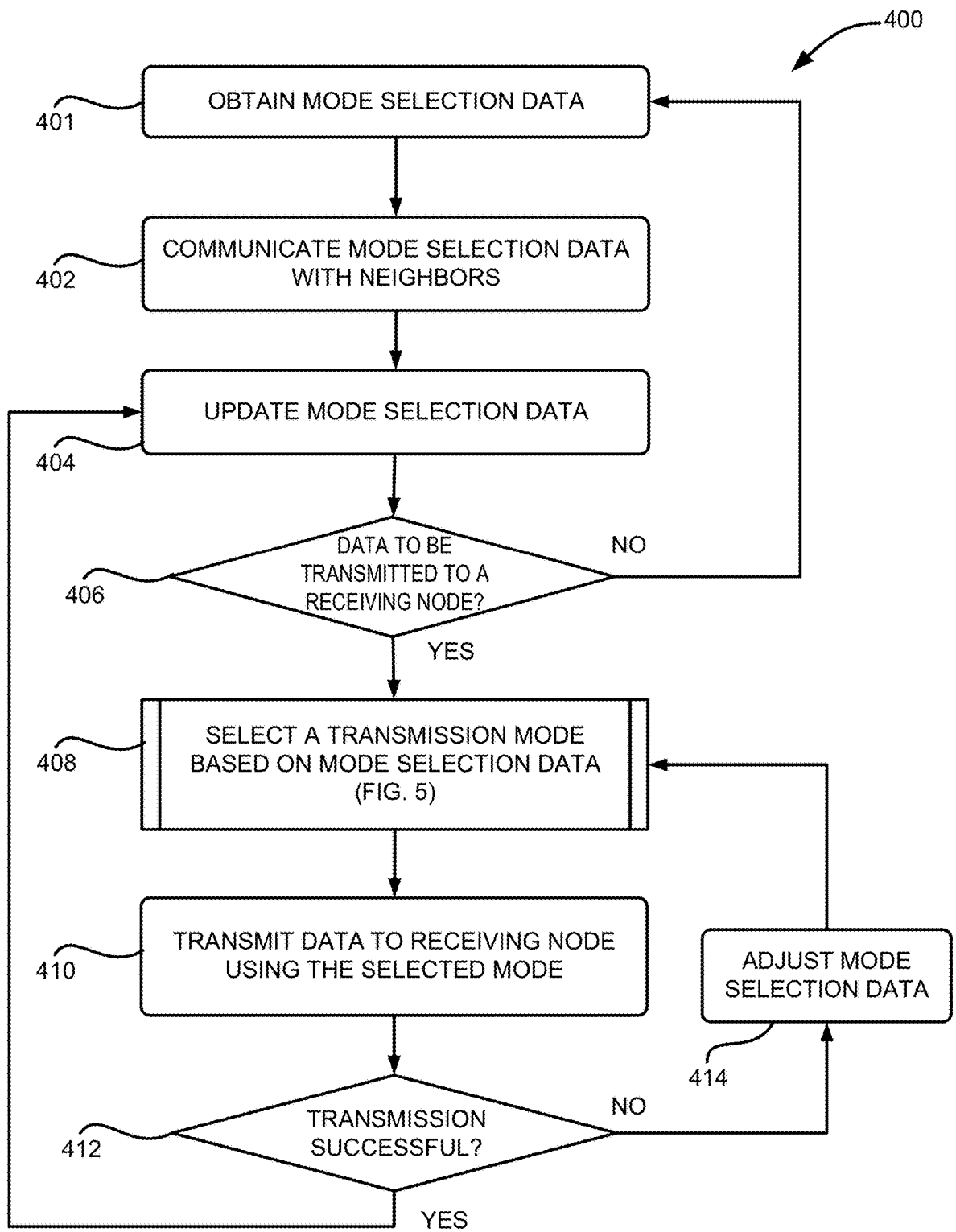
FIG. 4 is an example of a process for selecting a communication mode for a transmitting node and transmitting data using the selected mode, according to certain examples of the disclosure.

FIG. 4 is an example of a process 400 for selecting a communication mode for a transmitting node 202, according to certain examples of the disclosure. One or more nodes of the network 100 (e.g., the node 112 or the root node 114) implement operations depicted in FIG. 4 by executing suitable program code. For illustrative purposes, the process 400 is described with reference to certain examples depicted in the figures. Other implementations, however, are possible.

At block 401, the process 400 involves obtaining the mode selection data 206 that are available at the transmitting node 202. For example, the transmitting node 202 retains the device capabilities including the maximum output power of the transmitting node 202 and the SNR requirement, such as the minimum SNR required for each supported communication mode of the transmitting node 202. In addition, the transmitting node 202 also measures the noise floor at the transmitting node 202 for each supported communication mode, and records the current output transmission power setting of the transmitting node 202.

At block 402, the process 400 involves communicating the mode selection data 206 to the neighbors of the transmitting node 202. In some implementations, the transmitting node 202 can include dynamic data of the mode selection data 206 in each unicast transmission with a neighbor, such as when sending a data packet to the neighbor. The dynamic data can include the noise floor measured at the transmitting node 202 and the output transmission power setting of the transmitting node 202. For static data in the mode selection data 206 such as the maximum output power and the SNR requirement of the transmitting node 202, the transmitting node 202 only needs to transmit these types of data to each neighbor once, for example, when the transmitting node 202 first detects or discovers that a new neighbor has joined the network. Likewise, the neighbors of the transmitting node 202 can transmit their respective mode selection data 206 to the transmitting node 202 in a similar way so that the transmitting node 202 can receive the mode selection data 206 associated with these neighbor nodes.

At block 404, the process 400 involves updating the mode selection data 206 based on the data received from the neighbors of the transmitting node 202. For instance, the transmitting node 202 can record the RSSI of a packet received from a neighbor and decode the mode selection data that are included in the packet as discussed above with regard to block 402, such as the maximum output power and the SNR requirement of the neighbor, the noise floor measured at the neighbor and the output transmission power setting of the neighbor. The decoded data can be recorded and be associated with this particular neighbor in the mode selection data 206.

Further, the transmitting node 202 can utilize the received packets to estimate the path loss between the transmitting node 202 and the neighbor. For example, the transmitting node 202 can use Equation (5) discussed above to determine the path loss as the difference between the output transmission power of the received packet and the RSSI measured at the transmitting node 202. The transmitting node 202 can utilize the estimated path loss to update the smoothed path loss recorded in the mode selection data 206, such as by averaging the currently estimated path loss with previously estimated path losses using a specific weighting scheme.

At block 406, the process 400 involves determining whether the transmitting node 202 has data to be sent to a neighbor, i.e. a receiving node 212. If the transmitting node 202 determines that there is no data to be sent to its neighbors, the process 400 returns to block 401 where the transmitting node 202 obtains the current values of the mode selection data 206, such as by measuring the current noise floor. If the transmitting node 202 determines that there are data to be transmitted to the transmitting node 202, the process 400 proceeds to block 408, where the transmitting node 202 selects a communication mode for the communication of the data to the receiving node 212 based on the mode selection data 206. The selection is performed by considering both the data transmission of the communication and the acknowledgment transmission of the communication. One example process of selecting the communication mode is discussed below with regard to FIG. 5.

At block 410, the process 400 involves transmitting the data to the receiving node 212 using the selected communication mode. At block 412, the process 400 involves determining whether the transmission is successful. In one example, the transmitting node 202 makes such a determination based on whether acknowledgment packets 124 have been successfully received from the receiving node 212. If so, the process 400 proceeds to block 404, where the transmitting node 202 updates the mode selection data 206 based on the data collected through the acknowledgment packets 124. For example, the acknowledgment packets 124 might include the transmission power used by the receiving node 212 to transmit a corresponding acknowledgment packet. The transmitting node 202 can determine a received signal strength indicator for the received acknowledgment packets and then calculate an updated path loss by computing a difference between the transmission power and the received signal strength indicator. Further, the acknowledgment packets 124 might also include a noise floor measured at the receiving node 212. After receiving these types of information, the transmitting node 202 can update the mode selection data 206 accordingly.

If it is determined at block 412 that the communication was unsuccessful, the process 400 proceeds to block 414, where the transmitting node 202 adjusts the mode selection data 206. The reasons that the communication was unsuccessful can include that the data packets 122 were not successfully received by the receiving node 212, and that the acknowledgment packets 124 were not successfully received by the transmitting node 202. In either case, the transmitting node 202 determines that the communication was unsuccessful by determining that it did not receive the acknowledgement packets 124. The failure of the communication indicates that the analysis performed at block 408 while selecting the communication mode might be inaccurate. For example, the path loss estimation or the noise floor estimation at the receiving node 212 might be inaccurate resulting in a communication mode with an insufficient transmission power having been selected and used when transmitting the data packets. To address the problem, the transmitting node 202 can adjust the mode selection data 206 by increasing the path loss estimation by a certain amount, such as 1 dB, each time the transmission fails. The transmitting node 202 can also adjust the mode selection data 206 in other ways, such as increasing the noise floor estimation of the receiving node 212, adjusting the weighting scheme using in generating the smoothed noise floor, the smoothed path loss, or any combination of the above. The process 400 then proceeds to block 408 to select a communication mode again based on the adjusted mode selection data 206.

Figure 5:
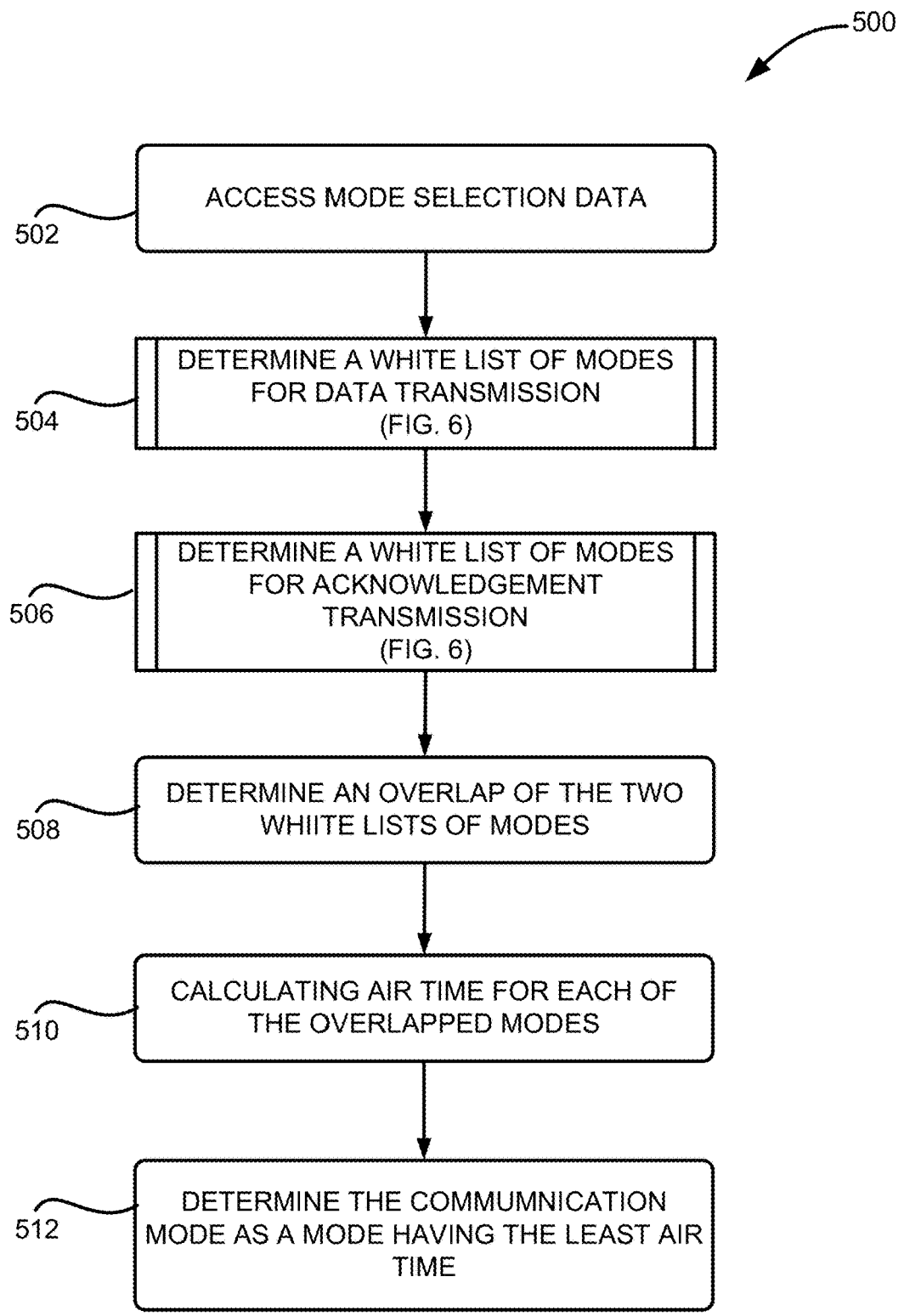
FIG. 5 is an example of a process for selecting a communication mode from multiple supported communication modes based on mode selection data, according to certain examples of the disclosure.

Turning now to FIG. 5, an example of a process 500 for selecting a communication mode from multiple supported communication modes of a transmitting node 202 based on mode selection data 206 is presented. FIG. 5 will be described in conjunction with FIG. 6 where an example of a process for determining a white list of communication modes that can be used to successfully transmit data based on mode selection data is presented according to certain examples of the disclosure.

At block 502, the process 500 involves accessing mode selection data 206 of the transmitting node 202. The mode selection data 206 can include the mode selection data for data transmission, i.e. transmitting data packets 122 from the transmitting node 202 to the receiving node 212, and mode selection data for acknowledgment transmission, i.e. transmitting the acknowledgment packets 124 from the receiving node 212 back to the transmitting node 202 for each of the communication modes supported by the transmitting node 202.

At block 504, the process 500 involves determining a white list of modes for data transmission based on the mode selection data for data transmission. Determining the white list of modes can be performing based on comparing the transmission power of the data packets 122 and the distortions introduced during the transmission, such as the path loss from the transmitting node 202 to the receiving node 212, the noise at the transmitting node 202, and so on.

Figure 6:
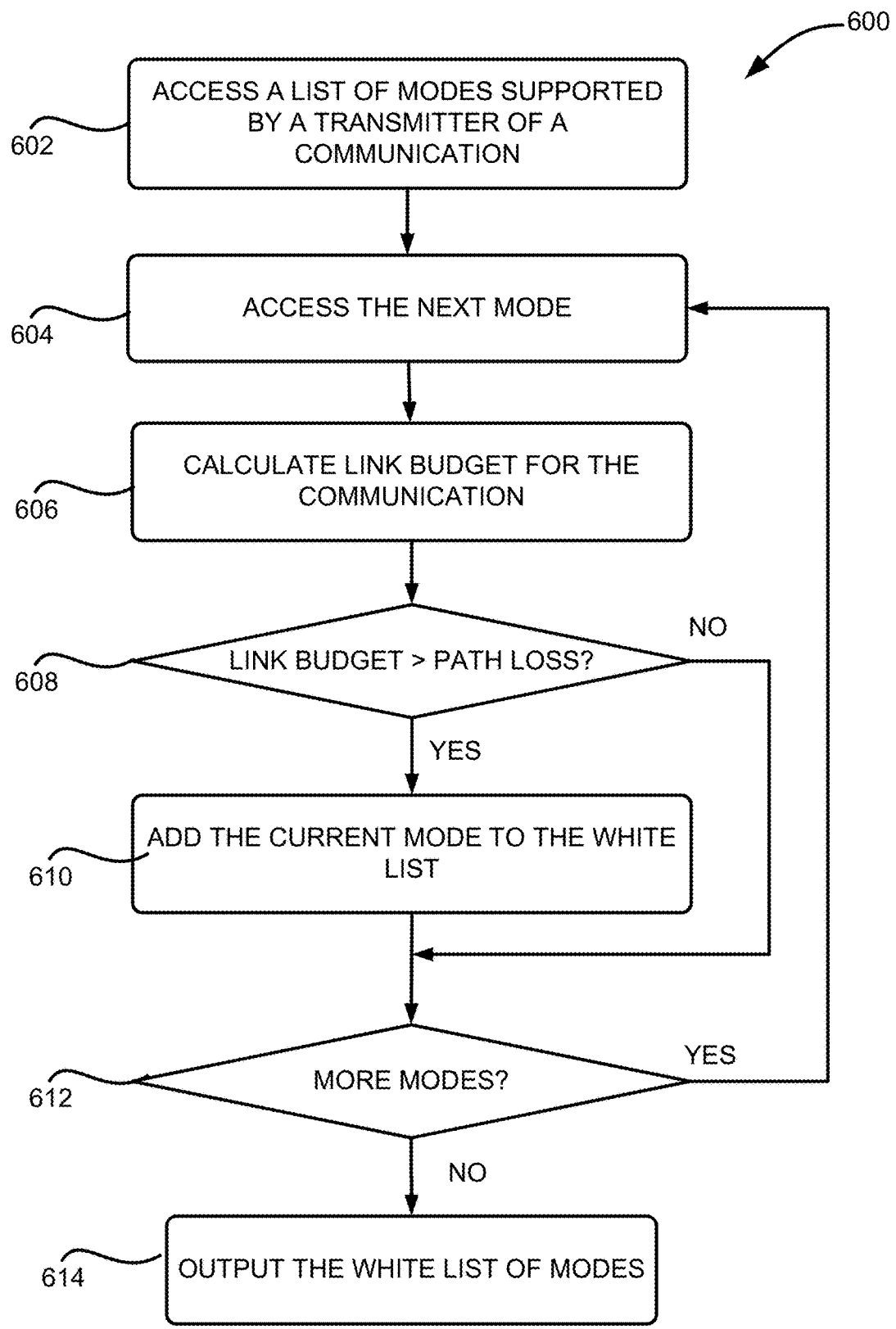
FIG. 6 is an example of a process for determining a white list of communication modes that can be used to successfully transmit data based on mode selection data, according to certain examples of the disclosure.

FIG. 6 illustrates an example process 600 for determining a white list of modes. At block 602, the process 600 involves accessing a list of modes supported by a transmitter of communication, which in this case, is the transmitting node 202. At block 604, the process 600 examines the next mode on the list as the current mode for examination. For the current mode, the process 600 involves calculating, at block 606, a link budget for the data transmission using the current mode which indicates how far the transmitting node 202 can reliably communicate with the receiving node 212 using the current mode. The transmitting node 202 can calculate the link budget using the information contained in the mode selection data 206, such as the transmission power of the data packets 122, the SNR requirement of the receiving node 212 and the noise floor at the receiving node 212. For example, the transmitting node 202 can calculate the link budget according to Equations (1) and (2) discussed above.

At block 606, the process 600 involves determining whether the link budget for the data transmission is higher than the path loss between the transmitting node 202 and the receiving node 212 using the current mode. The path loss data can be obtained from the mode selection data 206 of the transmitting node 202. If the transmitting node 202 determines that the link budget is higher than the path loss, the transmitting node 202 adds the current mode to the white list of the modes at block 610; otherwise, the process 600 involves a further determination, at block 612, that if there are more modes to be examined. If so, the process 600 proceeds to block 604, where the next mode is examined as discussed above. If there are no more modes to be examined, the process 600 involves outputting the white list of modes at block 614.

Referring back to FIG. 5, at block 506, the process 500 involves determining a white list of modes for acknowledgment transmission based on the mode selection data for acknowledgment transmission. Similar to block 504, the process 600 shown in FIG. 6 can be utilized to determine the white list of modes for acknowledgment transmission. In this case, the transmitter for process 600 is the receiving node 212 and the receiver for process 600 is the transmitting node 202, and the data being transmitted are the acknowledgment packets 124. Equations (3) and (4) can be utilized to determine the link budget for the acknowledgment transmission and to compare with the path loss to determine if a mode should be included in the white list of modes for acknowledgment transmission.

At block 508, the process 500 involves determining an overlap between the white list of modes for data transmission and the white list of modes for acknowledgment transmission. The overlap might contain one or more modes that are on both the white lists of modes. At block 510, the process 500 involves calculating air time for each of the overlapped modes, which includes the amount of time for the transmitting node 202 to transmit the data packets 122 to the receiving node 212 and receive the acknowledgment packets 124 from the receiving node 212. If the transmitting node 202 has a base mode different from the overlapped mode, the air time further includes the amount of time for switching the transmitting node 202 from the base mode to the overlapped mode which includes transmitting a mode switch header to the receiving node 212 using the base mode. At block 512, the process 500 involves selecting, from the overlapped modes, a communication mode that has the least air time for the transmitting node 202.

Communication Mode Selection Example

In the following, an example for selecting a communication mode for a gateway node 114 to communicate with an end node 112 is presented. In this example, the gateway is the transmitting node 202 and the end node is the receiving node 212. Both the gateway node 114 and the node 112 support 8 different communication modes and their associated mode selection data are shown in Tables 1 and 2.

TABLE 1

Mode selection data for data transmission (transmitting data packets from the gateway to the end node)

| Supported Mode by Gateway | $P_{out}$ (dBm) of gateway | Path Loss (dB) | SNR of end node (dB) | Noise Floor of end node (dBm) |
|---|---|---|---|---|
| 1 | 30 | 120 | 12 | −120 |
| 2 | 30 | 120 | 15 | |
| 3 | 30 | 120 | 21 | |
| 4 | 30 | 120 | 18 | |
| 5 | 25 | 120 | 11 | −110 |
| 6 | 25 | 120 | 14 | |
| 7 | 25 | 120 | 17 | |
| 8 | 23 | 120 | 20 | |

TABLE 2

Mode selection data for acknowledgment transmission (transmitting acknowledgement packets from the end node to the gateway)

| Supported Mode by Gateway | $P_{out}$ (dBm) of gateway | Path Loss (dB) | SNR of end node (dB) | Noise Floor of end node (dBm) |
|---|---|---|---|---|
| 1 | 27 | 120 | 12 | −118 |
| 2 | 27 | 120 | 15 | |
| 3 | 27 | 120 | 21 | |
| 4 | 27 | 120 | 18 | |
| 5 | 25 | 120 | 11 | −105 |
| 6 | 25 | 120 | 14 | |
| 7 | 25 | 120 | 17 | |
| 8 | 23 | 120 | 20 | |

The white list of modes for data transmission can be determined using the process described above. Table 3 shows the link budgets for each of the eight modes for the data transmission and whether the associated mode is included in the white list of modes for data transmission.

TABLE 3

Determining the white list of modes for data transmission

| Supported Mode by Gateway | Link budget (dB) | Path Loss (dB) | White list of modes for data transmission |
|---|---|---|---|
| 1 | 138 | 120 | Yes |
| 2 | 135 | 120 | Yes |
| 3 | 129 | 120 | Yes |
| 4 | 132 | 120 | Yes |
| 5 | 124 | 120 | Yes |
| 6 | 121 | 120 | Yes |
| 7 | 118 | 120 | No |
| 8 | 113 | 120 | No |

Similarly, the white list of modes for acknowledgment transmission can be determined using the process described above. Table 4 shows the link budgets for each of the eight modes for the acknowledgment transmission and whether the associated mode is included in the white list of modes for acknowledgment transmission.

TABLE 4

Determining the white list of modes for acknowledgment transmission

| Supported Mode by Gateway | Link budget (dB) | Path Loss (dB) | White list of modes for data transmission |
|---|---|---|---|
| 1 | 133 | 120 | Yes |
| 2 | 130 | 120 | Yes |
| 3 | 129 | 120 | Yes |
| 4 | 127 | 120 | Yes |
| 5 | 119 | 120 | No |
| 6 | 116 | 120 | No |
| 7 | 113 | 120 | No |
| 8 | 107 | 120 | No |

Based on the two white lists shown in Tables 3 and 4, the gateway can determine the overlapped modes are modes 1-4. The gateway can further calculate the air time for modes 1-4 and select one mode that leads to the least amount of air time as the communication mode.

Exemplary Node

Figure 7:
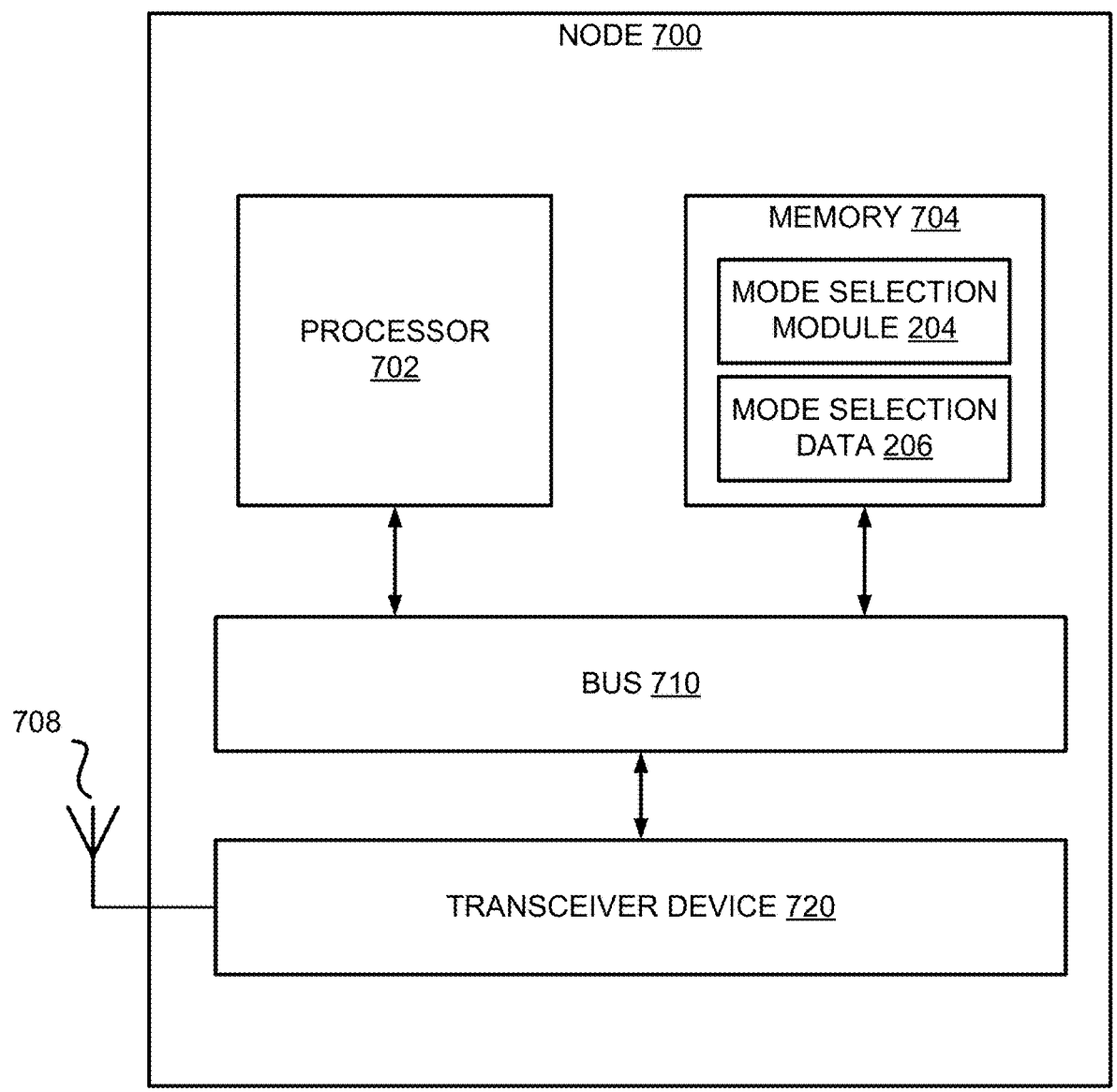
FIG. 7 is a block diagram depicting an example of a computing system suitable for implementing aspects of the techniques and technologies presented herein.

FIG. 7 illustrates an exemplary node 700 that can be employed to implement the communication mode selection described herein, such as a node 112 or a root node 114. The node 700 may include a processor 702, memory 804, and a transceiver device 720 each communicatively coupled via a bus 710. The components of node 700 can be powered by an A/C power supply or a low energy source, such as a battery (not shown). The transceiver device 720 can include (or be communicatively coupled to) an antenna 708 for communicating with other nodes. In some examples, the transceiver device is a radio-frequency ("RF") transceiver for wirelessly transmitting and receiving signals.

The processor may include a microprocessor, an application-specific integrated circuit ("ASIC"), a state machine, a field programmable gate array ("FPGA") or other suitable computing device. The processor can include any number of computing devices and can be communicatively coupled to a computer-readable media, such as memory 704. The processor 702 can execute computer-executable program instructions or access information stored in memory to perform operations, such as the mode selection module 204 and the mode selection data 206 described herein. The instructions may comprise processor-specific instructions generated by a compiler and/or an interpreter from code written in any suitable computer-programming language. When instructions, such as those provided in the mode selection module 204, are executed, they may configure the node 700 to perform any of the operations described herein. Although the processor, memory, bus, and transceiver device are depicted in FIG. 7 as separate components in communication with one another, other implementations are possible. The systems and components discussed herein are not limited to any particular hardware architecture or configuration.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

The features discussed herein are not limited to any particular hardware architecture or configuration. A computing device can include any suitable arrangement of components that provide a result conditioned on one or more inputs. Suitable computing devices include multipurpose microprocessor-based computer systems accessing stored software (i.e., computer-readable instructions stored on a memory of the computer system) that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied; for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation and does not preclude inclusion of such modifications, variations, and/or additions to the present subject matter as would be readily apparent to one of ordinary skill in the art.

What is claimed is:

1. A method for determining a communication mode for a communication between a transmitting node and a receiving node in a mesh network, the method comprising:
   accessing, by the transmitting node and in response to determining that there are data packets to be transmitted to the receiving node, mode selection data that describe communication conditions of the transmitting node and the receiving node, the mode selection data comprising an SNR requirement of the receiving node, an SNR requirement of the transmitting node and a maximum transmission power of the receiving node and a transmission power of the transmitting node;
   determining, by the transmitting node, a first list of modes that can be used by the transmitting node to transmit the data packets to the receiving node based, at least in part, upon the SNR requirement of the receiving node and the transmission power of the transmitting node in the mode selection data;
   determining, by the transmitting node, a second list of modes that can be used by the receiving node to transmit acknowledgment packets to the transmitting node based, at least in part, upon the SNR requirement of the transmitting node and the maximum transmission power of the receiving node in the mode selection data;
   selecting, by the transmitting node, a communication mode that is on both the first list of modes and the second list of modes; transmitting, by the transmitting node, the data packets to the receiving node using the selected communication mode; and
   receiving, by the transmitting node from the receiving node, the acknowledgement packets in the selected communication mode.

2. The method of claim 1, wherein selecting the communication mode that is on both the first list of modes and the second list of modes comprises:
   calculating an air time for each mode that is on both the first list of modes and the second list of modes, the air time of a mode comprising an amount of time for the transmitting node to complete a communication with the receiving node using the mode, wherein completing a communication comprises transmitting the data packets to the receiving node and receiving the acknowledgement packets from the receiving node; and
   selecting the communication mode by selecting a mode from the modes on both the first list of modes and the second list of modes that has the least air time.

3. The method of claim 2, wherein calculating the air time for a mode comprises:
   calculating an amount of time for transmitting the data packets to the receiving node and receiving the acknowledgment packets from the receiving node;
   determining that a base mode of the transmitting node is different from the mode; and
   in response to determining that a base mode of the transmitting node is different from the mode, adding, to the air time for the mode, a second amount of time for switching from the base mode to the mode.

4. The method of claim 3, wherein the second amount of time comprises time for transmitting a mode switch header to the receiving node using the base mode of the transmitting node and a delay caused by switching from the base mode to the mode.

5. The method of claim 2,
   wherein the transmitting node supports a plurality of bands;
   wherein selecting the communication mode further comprises selecting a band from the plurality of bands over which the selected communication mode has the least air time; and
   wherein transmitting the data packets to the receiving node comprises transmitting the data packets to the receiving node in the selected band using the selected communication mode.

6. The method of claim 1, wherein the mode selection data further comprise one or more of a maximum transmission power of the transmitting node, a noise floor at the receiving node, a noise floor at the transmitting node, or a path loss between the transmitting node and the receiving node.

7. The method of claim 1, wherein determining the first list of modes comprises:
   determining a plurality of modes that are supported by the transmitting node;
   determining a path loss for transmitting the data packets to the receiving node;
   for each mode of the plurality of modes,
      calculating a link budget for transmitting the data packets to the receiving node using the mode based at least in part upon the SNR requirement of the receiving node and the transmission power of the transmitting node;
      determining that the link budget is higher than the path loss; and in response to determining that the link budget is higher than the path loss, adding the mode to the first list of modes.

8. The method of claim 7, wherein calculating the link budget for transmitting the data packets to the receiving node using the mode comprises calculating a difference between the transmission power of the mode and a sum of the SNR requirement and a noise floor at the receiving node.

9. The method of claim 7, wherein the path loss for transmitting the data packets to the receiving node using the mode is determined by calculating a difference between a transmission power of a previous data packet received from the receiving node and a received signal strength indicator of the previous data packet measured at the transmitting node.

10. The method of claim 1, wherein determining the second list of modes comprises:
  determining two or more modes that are supported by the receiving node;
  determining a path loss for transmitting the acknowledgment packets from the receiving node to the transmitting node;
  for each mode of the two or more modes,
    calculating a link budget for transmitting the acknowledgment packets from the receiving node to the transmitting node using the mode based, at least in part, upon the SNR requirement of the transmitting node and the maximum transmission power of the receiving node;
    determining that the link budget is higher than the path loss; and
    in response to determining that the link budget is higher than the path loss, adding the mode to the second list of modes.

11. The method of claim 10, wherein calculating the link budget for transmitting the acknowledgment packets using the mode comprises calculating a difference between a transmission power of the mode and a sum of the SNR requirement and a noise floor at the transmitting node.

12. The method of claim 1, further comprising:
  determining that transmitting the data packets using the selected communication mode has failed;
  in response to determining that transmitting the data packets using the selected communication mode has failed,
    modifying the mode selection data by increasing an estimated path loss between the transmitting node and the receiving node;
    updating the first list of modes and the second list of modes based on the modified mode selection data;
    determining a new communication mode that is on both the updated first list of modes and the updated second list of modes; and
    transmitting the data packets to the receiving node using the new communication mode.

13. A node of a network, comprising:
  a processor configured to execute computer-readable instructions;
  a memory configured to store the computer-readable instructions that, when executed by the processor, cause the processor to perform operations comprising:
    accessing, in response to determining that there are data packets to be transmitted to a receiving node, mode selection data that describe communication conditions of the node and the receiving node, the mode selection data comprising an SNR requirement of the receiving node, an SNR requirement of the node and a maximum transmission power of the receiving node and a transmission power of the node;
    determining a first list of modes that can be used by the node to transmit data packets to the receiving node based, at least in part, upon the SNR requirement of the receiving node and the transmission power of the node in the mode selection data;
    determining a second list of modes that can be used by the receiving node to transmit acknowledgment packets to the node based, at least in part, upon the SNR requirement of the node and the maximum transmission power of the receiving node in the mode selection data;
    selecting a communication mode that is on both the first list of modes and the second list of modes;
    transmitting the data packets to the receiving node using the selected communication mode; and
    receiving, from the receiving node, the acknowledgement packets in the selected communication mode.

14. The node of claim 13, wherein the mode selection data further comprise one or more of a maximum transmission power of the node, a noise floor at the receiving node, a noise floor at the node, or a path loss between the node and the receiving node.

15. The node of claim 14, wherein the operations further comprise:
  determining that a new neighbor has joined the network;
  in response to determining that a new neighbor has joined the network, transmitting, to the new neighbor, the maximum transmission power and the SNR requirement of the node;
  receiving, from the new neighbor, a maximum transmission power and an SNR requirement of the new neighbor; and
  updating the mode selection data to include the maximum transmission power and the SNR requirement of the new neighbor.

16. The node of claim 14, wherein the data packets each comprises a field describing a transmission power used to transmit a corresponding data packet and a noise floor estimated at the node.

17. The node of claim 14, wherein the received acknowledgment packets each comprises a field describing a transmission power used by the receiving node to transmit a corresponding acknowledgment packet and a noise floor measured at the receiving node, and wherein the operations further comprise;
  determining a received signal strength indicator based on the received acknowledgment packets;
  calculating an updated path loss by computing a difference between the transmission power used by the receiving node and the received signal strength indicator; and
  updating the mode selection data to include the updated path loss and the noise floor at the receiving node.

18. The node of claim 13, wherein selecting the communication mode that is on both the first list of modes and the second list of modes comprises:
  calculating an air time for each mode that is on both the first list of modes and the second list of modes, the air time of a mode comprising an amount of time for the node to complete a communication with the receiving node using the mode, wherein completing a communication comprises transmitting the data packets to the receiving node and receiving the acknowledgement packets from the receiving node; and selecting the communication mode by selecting a mode from the modes on both the first list of modes and the second list of modes that has the least air time.

19. The node of claim 18, wherein calculating the air time for a mode comprises:
calculating an amount of time for transmitting the data packets to the receiving node and receiving the acknowledgment packets from the receiving node;
determining that a base mode of the node is different from the mode; and
in response to determining that a base mode of the node is different from the mode, adding, to the air time for the mode, a second amount of time for switching from the base mode to the mode.

20. A method for determining a communication mode for a transmitting node in a network, the method comprising:
determining, by the transmitting node, a first list of modes that can be used by the transmitting node to transmit data packets to a receiving node based, at least in part, upon an SNR requirement of the receiving node and a transmission power of the transmitting node;
determining, by the transmitting node, a second list of modes that can be used by the receiving node to transmit acknowledgment packets to the transmitting node based, at least in part, upon an SNR requirement of the transmitting node and a maximum transmission power of the receiving node;
selecting, by the transmitting node, a communication mode that is on both the first list of modes and the second list of modes; transmitting, by the transmitting node, the data packets to the receiving node using the selected communication mode; and
receiving, by the transmitting node from the receiving node, the acknowledgement packets in the selected communication mode.

21. The method of claim 20, wherein selecting the communication mode that is on both the first list of modes and the second list of modes comprises:
calculating an air time for each mode that is on both the first list of modes and the second list of modes, the air time of a mode comprising an amount of time for the transmitting node to complete a communication with the receiving node using the mode, wherein completing a communication comprises transmitting the data packets to the receiving node and receiving the acknowledgement packets from the receiving node; and
selecting the communication mode by selecting a mode from the modes on both the first list of modes and the second list of modes that has the least air time.

22. The method of claim 20, wherein determining the first list of modes comprises:
determining a plurality of modes that are supported by the transmitting node;
determining a path loss for transmitting the data packets to the receiving node;
for each mode of the plurality of modes,
calculating a link budget for transmitting the data packets to the receiving node using the mode based at least in part upon the SNR requirement of the receiving node and the transmission power of the transmitting node;
determining that the link budget is higher than the path loss; and
in response to determining that the link budget is higher than the path loss, adding the mode to the first list of modes.

23. The method of claim 20, wherein determining the second list of modes comprises:
determining two or more modes that are supported by the receiving node;
determining a path loss for transmitting the acknowledgment packets from the receiving node to the transmitting node;
for each mode of the two or more modes,
calculating a link budget for transmitting the acknowledgment packets from the receiving node to the transmitting node using the mode based, at least in part, upon the SNR requirement of the transmitting node and the maximum transmission power of the receiving node;
determining that the link budget is higher than the path loss; and
in response to determining that the link budget is higher than the path loss, adding the mode to the second list of modes.

* * * * *